Dec. 18, 1945.  F. J. LINGEL  2,391,058
ELECTRICAL INSTRUMENT AND SYSTEM
Original Filed Aug. 23, 1940   3 Sheets-Sheet 1
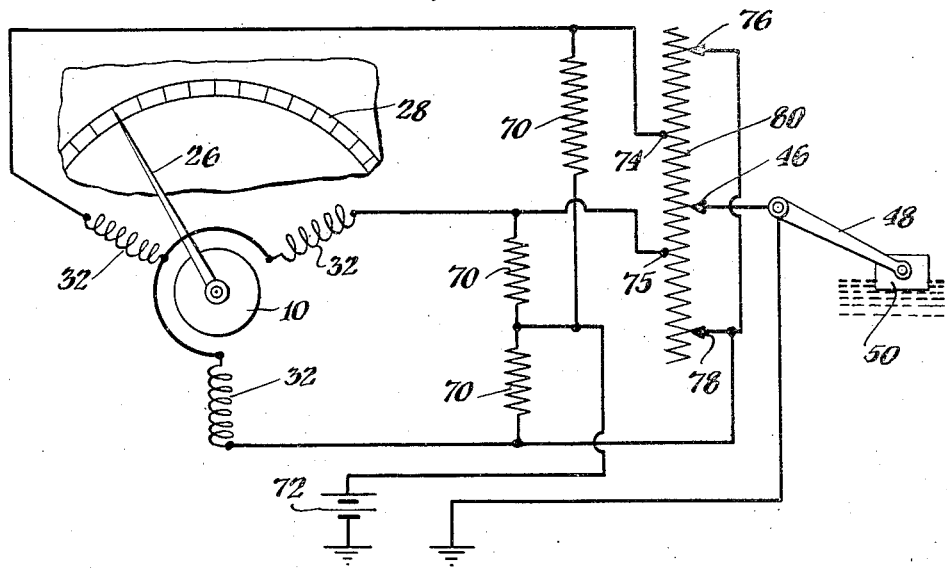
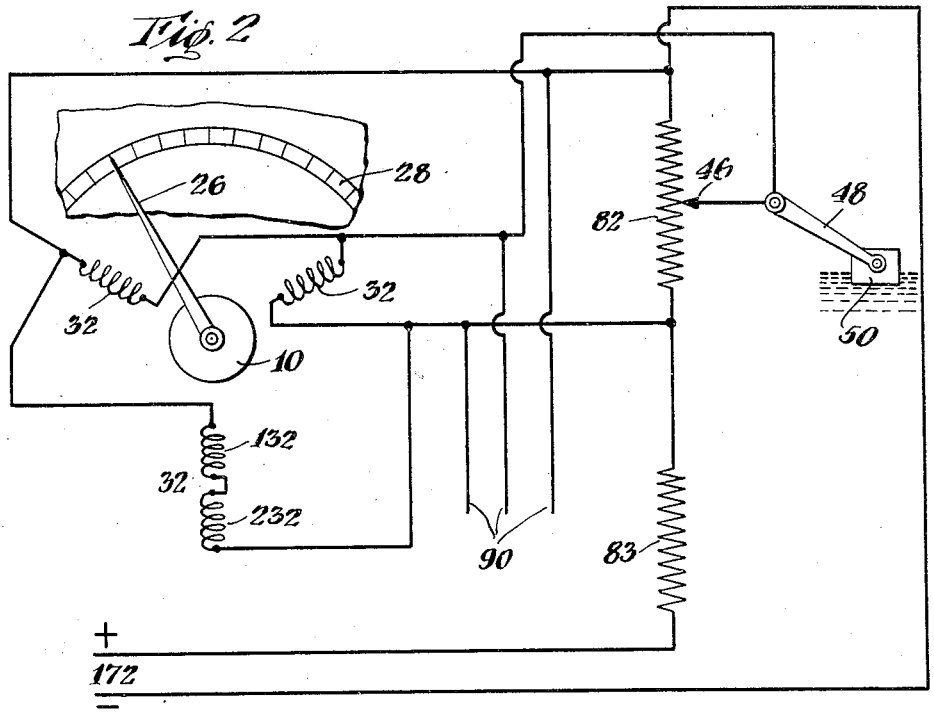
INVENTOR
Frederick J. Lingel
BY
Cooper, Kerr & Dunham
ATTORNEYS Dec. 18, 1945.    F. J. LINGEL    2,391,058
ELECTRICAL INSTRUMENT AND SYSTEM
Original Filed Aug. 23, 1940    3 Sheets-Sheet 2

INVENTOR
Frederick J. Lingel
BY
ATTORNEYS

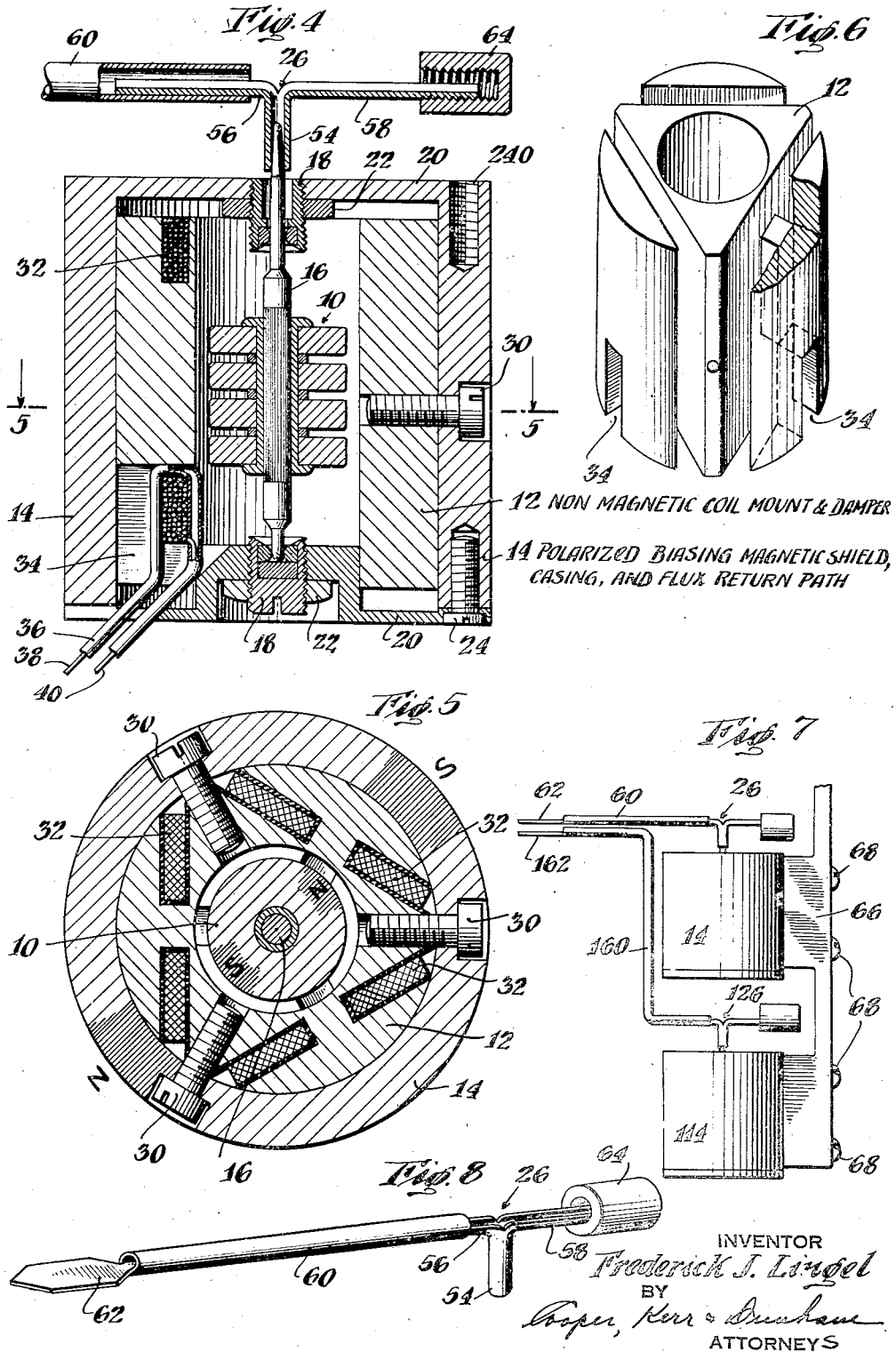

Patented Dec. 18, 1945

2,391,058

UNITED STATES PATENT OFFICE 2,391,058

ELECTRICAL INSTRUMENT AND SYSTEM

Frederick J. Lingel, Bluffton, Ohio, assignor to The Liquidometer Corporation, Long Island City, N. Y., a corporation of Delaware Continuation of application Serial No. 353,783, August 23, 1940. This application December 12, 1944, Serial No. 567,848

5 Claims. (Cl. 177—351)

This invention relates to electromagnetic translating devices. More specifically, it relates to indicating instruments.

The present invention is a continuation of my prior and copending application, Serial No. 353,783, filed August 23, 1940, and having the same title as the present application, said former application being now abandoned in favor of the present application.

Some of the important objects of the invention are to provide devices of the type described which are compact, efficient and reliable in operation, comparatively simple in construction, and which may be readily assembled and disassembled.

Certain features of the invention herein disclosed are disclosed also in my copending application Serial No. 305,255, filed in the United States Patent Office on November 20, 1939, for "Electrical translating instruments or devices," now Patent No. 2,339,021, granted January 11, 1944.

Other objects of the instant invention are to effect improvements in the instrument disclosed in the said copending application.

Further objects are to provide novel forms of circuit connections embodying the improved instrument or instruments in combination.

Other objects and advantages of my invention will be stated hereinafter or will appear to those skilled in the art upon reading the following description of the invention and of the manner and process of making, constructing, compounding, and using it, and I shall also explain herein what I now believe to be the principle thereof, and the best mode in which I have contemplated applying that principle.

Desiring to have it understood that my invention may be carried out by other means and with other apparatus, and that it may be used in other environments and for other purposes, I shall now proceed to describe what I now consider to be a preferred form of apparatus for practicing the invention.

Referring to the drawings:

Fig. 1 is a wiring diagram showing one of my instruments so electrically connected that full control and wide scale deflection may be obtained with a single movable automatically controlling contact.

Fig. 2 is a wiring diagram in which the electrical connections are such that the normal scale deflection produced by two coils may be varied by the use of a third coil which is differentially wound.

Fig. 4 is a section taken on a plane through the axis of an instrument embodying some of the features of the improvement.

Fig. 5 is a transverse section taken on the line 5—5 of Fig. 4.

Fig. 6 is a detail view of the coil mount forming a part of the instrument shown in Figs. 4 and 5.

Fig. 7 is an elevation of a compact composite instrument employing two of the instruments such as that shown in Figs. 4 to 6 but with the pointer or index of one offset so that both pointers may be read upon a single or common scale.

Fig. 8 is a fragmentary detail view showing an improved pointer construction which is shown also in Figs. 4 and 7.

Figure 3:
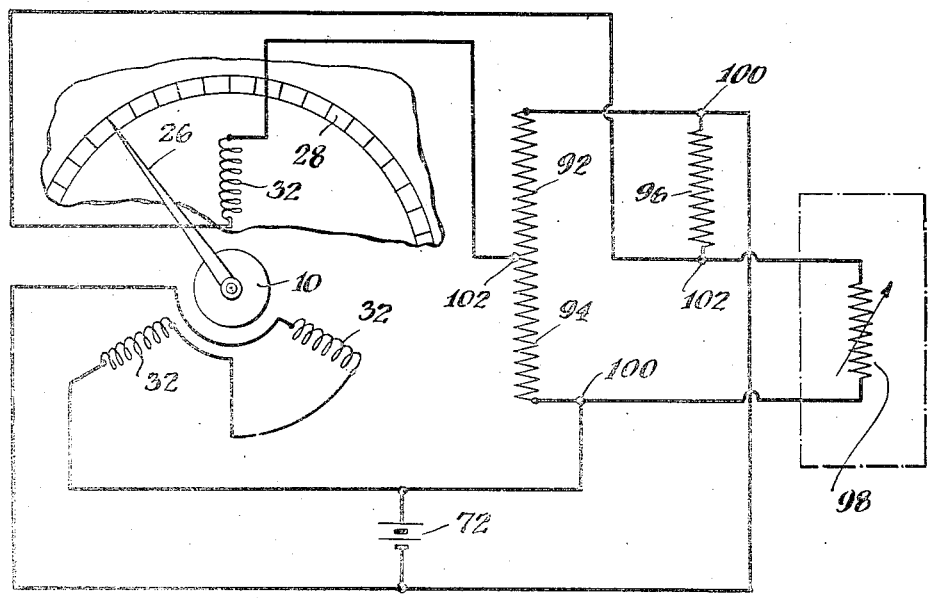
Fig. 3 is a wiring diagram illustrating electrical connections which may be employed when the control is to be effected by a thermally responsive device, such as a resistance bulb.

Referring to Figs. 4, 5 and 6, it will be seen that the instrument there shown corresponds in many important respects to that shown and described in Figs. 2, 3 and 4 of my cited Patent No. 2,339,021, and I shall first describe the features of construction in common to the two and, later herein, points of departure and improvement.

The instrument shown in Figs. 4 to 6 comprises a rotor or armature 10, which is permanently magnetized or poled transversely with respect to its axis of rotation or oscillation, a combined coil mount and damper 12, and a casing 14 which constitutes also a flux return path, magnetic shield, bearing support, and zero biasing means.

The rotor 10 is preferably cylindrical and made of high coercive force material, such as Alnico, and is permanently magnetized so as to have a north pole on one side of the cylinder and a south pole on the other side substantially diametrically opposed to the north pole. The rotor 10 is secured to a shaft 16 coaxial with the rotor and rotatably mounted in bearings 18, 18, carried by the end plates 20, 20. Each of the bearings is longitudinally adjustable in its plate 20, as by being screw threadedly connected therewith, lock nuts 22, 22 being provided for holding the bearings in any position to which the bearings have been adjusted. Any rotation or oscillation of the rotor 10 produces corresponding movement of the shaft 16.

While other forms of indicating means, such as a recording couple, may be utilized, I have shown an indicating couple consisting of a pointer 26 secured to a prolongation of the shaft 16 and a suitably calibrated dial or scale 28, not shown in Fig. 4 but shown, in part, in Figs. 1, 2 and 3.

The coil mount 12 is constructed of a non-magnetic metal, such as brass, surrounds the rotor 10 and is surrounded by the casing 14 to which it is detachably secured by radially extending screws 30. The number of coils employed depends upon the particular use to which the instrument is to be put. The coils 32 are each so mounted that its flux axis intersects and is at a right angle to the axis of rotation of the rotor 10 and so that the flux axes of the coils intersect each other at an angle of 120°. The coil mount 12 is substantially of the shape of a hollow cylinder and is slotted or cut away as shown (see especially Fig. 6) to form spools upon which the coils 32 are wound. Each spool portion of the coil mount 12 is provided with a slot 34 (see Figs. 4 and 6) through which the leads of the coil, mounted on that spool portion, extend. Before winding the coils on the spool portions, the coil mount 12, or at least each spool portion thereof, is dipped in insulating material, such as Bakelite shellac or the like, which is then set or solidified by heating.

In winding, the starting end 38 of each coil 32 is stuck through the wall of a piece of flexible insulating tubing 36, such as a fabric tube or sleeve, mounted in the slot 34. After each coil has been wound, its finishing end 40 is stuck through the wall of another sleeve 36 so that the parts then appear as shown in the lower left hand portion of Fig. 4. The sleeves 36 thus provide quite satisfactory insulation, protection, and reinforcement for the leads of the coils.

The casing 14 is preferably made of cold rolled steel which is annealed after it has been machined. The casing is permanently magnetized or poled so as to have a north pole at one side and a diametrically opposed south pole on the other side, the poling being such that it will bias the permanently magnetized rotor 10 toward a zero or neutral position and cause it to occupy that position when the coils are all deenergized.

It will be noted that each of the coils 32 is embedded in the coil mount 12 and lies wholly to one side of the rotor 10. This facilitates assembly and disassembly of the instrument including insertion of the rotor 10 into, and removal of the rotor 10 from, the instrument, without removing or in any way interfering with the coils 32, 32.

The coil mount 12 serves as an effective low resistance eddy current damper for the rotor 10. Particularly is this so since this non-magnetic metallic coil mount occupies the space between the rotor 10 and the casing 14 except for the comparatively small portion thereof occupied by the coils 32, 32 embedded in the coil mount.

The casing 14 functions also as a support for the end plates and bearings, as a return path for the magnetic flux, as a magnetic shield, and as a biasing device for the rotor 10.

The instrument may be easily constructed, assembled, and disassembled.

The instrument may be made quite compact and small. I have constructed a highly satisfactory indicating instrument embodying the invention in which the outside diameter of the casing 14 is three-fourths of an inch and in which the distance between the end plates 20, 20 is three-forths of an inch.

I shall now proceed to describe differences between the construction shown in Figs. 4 to 6 hereof and that shown in Figs. 2 to 4 of my cited patent, some of which differences are of greater importance than others.

In my cited patent I showed only two coils 32 with their flux axes at an angle of 120°, but the specification of said patent stated that if pointer rotation of 360° or more were desired, three or more coils equiangularly spaced about the rotor 10 would be employed. In the instant application, three such coils 32, 32, 32, are shown, and each has its flux axis at right angles to the axis of rotation of the rotor 10, and the flux axis of each coil is at an angle of 120° with respect to that of the adjacent coils 32, 32. In short, the three coils are so arranged that their flux axes are equiangularly arranged around the axis of rotation of the rotor 10.

In the cited patent, each end plate 20, 20, was shown detachably secured to a corresponding end of the casing 14 by means of screws 24. As shown in the instant application, only one of the end plates 20 is so connected to the casing 14; the other end plate 20 being integral with the casing 14 so as to provide a cup-shaped housing which is closed by the other, and detachable, end plate 20. This provides a simplified construction.

The tapped opening 240 shown at the upper right of Fig. 4, may be employed to receive a screw to facilitate mounting of the instrument or to support the scale for the pointer.

In my cited patent I disclosed a rotor 10 consisting of a single cylinder. In the instant application (Fig. 4) I show the rotor 10 as comprising a plurality of axially spaced coaxial circular discs, shown as four in number. This construction of the rotor provides maximum magnetic flux at the coil faces and with light weight and mechanical rigidity.

The pointer 26 is also of novel construction. It comprises a metallic tube split throughout a portion of its length to form a hub or shaft-receiving portion 54 having two oppositely extending arms 56, 58, each being one-half of a hollow cylinder. A metallic tube 60 is split, flattened, and cut or stamped to form the index portion 62 and is secured at its opposite end to the arm 56. The last mentioned connection is effected by telescoping the tube 60 with the arm 56 and soldering or otherwise securing the two parts together. The opposite arm 58 is shown screw-threaded to receive the interiorly tapped counter-weight 64, thereby effecting an adjustable arrangement whereby the entire pointer 26 is balanced, i. e., has its center of gravity located on the axis of the shaft 16. This construction of the pointer 26 provides a comparatively inexpensive, sturdy and light structure.

As stated above, the casing 14 is preferably made of cold rolled steel which is annealed after it has been machined. A preferred heat treatment is as follows. The shell or casing 14 is heated to about 1600° F. in the absence of oxygen, soaked at 1600° F. for about two hours, and cooled at a rate not greater than about 100° F. per hour to room temperature.

Because of its compactness and small size, the instrument shown in Figs. 4 to 6 lends itself admirably to constructions such as that shown in Fig. 7 in which it is desired to have two separately controlled pointers read upon the same single dial or scale. Referring to Fig. 7, the upper instrument 14—26—60—62 is the same as that shown in Figs. 4 to 6 and 8 and described above, except that it is shown secured to a stationary bracket 66 by means of radially extending screws 68, 68 projecting through suitable holes in the bracket and which screw into suitably tapped openings in the shell or casing 14.. The lower instrument 114—126—160—162 is like unto the other except that the tubular portion 160 of its pointer is offset by bending it vertically and horizontally, as shown, so as to cause its index portion 162 to rotate in a plane below and parallel to the plane in which the upper index portion 62 rotates. The lower instrument is mounted on the bracket 66 in manner similar to the upper instrument and so that pointers 26 and 126 rotate about a common geometric axis. The two instruments, as stated, may be separately controlled but indicate upon a single dial. They may also be used as a comparison device. Because of the small size of the casings 14, 114, the pointers 26, 126 may be kept comparatively short and therefore light in weight, sensitive, and with low moments of inertia. The particular pointer construction, by virtue of its light weight for the necessary sturdiness, also lends considerably to the desired result. In short, by virtue of the small size of parts which nevertheless produce and attain the required torque and mechanical strength, the double pointer common dial arrangement is rendered feasible and reliable under conditions of use which would otherwise prevent the attainment of that object.

In Fig. 1 I have shown one of my instruments so electrically connected and controlled by a single contact as to give a range of pointer deflection up to 360° in accordance with the position of the controlling contact. The contact 46 is shown connected to the arm 48 of a float 50 so as to assume different positions in accordance with the position of the float and, therefore, in accordance with the level of the liquid supporting the float. The instrument 10—32—26—28 will be readily recognized as that shown in Figs. 4 to 6 and described above.

The electrical connections shown are as follows. The coils 32 are electrically connected together at one end. Three resistors 70, 70, 70 are electrically connected together at one end and to one side or pole of a suitable source of E. M. F. 72. The free end of each resistor 70 is electrically connected to the free end of a corresponding coil 32. The last mentioned (free) ends of the coils 32, 32, 32 and the resistors 70, 70, 70 are separately electrically connected to a fixed tap 74, another fixed tap 75, and a pair of manually adjustable taps 76—78 of a resistor 80, respectively and as shown. The manually adjustable taps 76, 78 are electrically connected to each other. The float-controlled contact 46 is electrically connected to the pole or terminal of the source 72 opposite to that mentioned above.

By suitably selecting the electrical constants, the combination shown in Fig. 1 may be employed to give a scale reading at 26—28 throughout the full 360° of movement of the pointer 26, the scale 28 being calibrated to indicate, in conjunction with the pointer 26, the remote liquid level at the float 50. By manually adjusting one or the other or both of the taps 76, 78, along the resistor 80, the deflection obtained at either or both ends of the scale 28 may be selectively adjusted or controlled. This last mentioned feature of end scale adjustment, per se, is disclosed and claimed in United States Patent No. 2,195,813, patented April 2, 1940, "Rheostat adjustment," Clarence A. de Giers.

While other constants or combinations of constants may be employed, satisfactory results may be attained with the following. Each coil 32 has 1600 turns and a resistance of 450 ohms. The resistance of each resistor 70 is 240 ohms. The resistance of the resistor 80 between the taps 74—75 is 400 ohms, between the taps 74—76 is 400 ohms, and between the taps 75—78 is 400 ohms. The E. M. F. of the source 72 is 12 volts.

In Fig. 2 I have shown a combination somewhat different from that shown in Fig. 1. In the main, the instrument 10—32—26—28 is the same as that shown in Figs. 1, 4, 5, 6 and described above. However, one of the coils 32 is wound in two sections 132, 232 which are so wound or connected as to oppose each other. If the coil 32, wound in two sections 132, 232 is disconnected from the circuit, the scale angle would be 120°. By connecting coil 32 and by providing more turns in one of the opposing sections 132, 232 than in the other of said sections, the full scale deflection of the pointer 26 may be made greater or less than 120° to an extent depending upon the difference between the numbers of turns in the two sections. When the number of turns of either section 132, 232 is greater than that of the other of said sections, the electrical connection of the differential coil 32 (132—232) with respect to the other two coils 32, 32 determines whether the full scale deflection of the pointer 26 is greater or less than 120°. If the predominant effect of the coil combination (132—232) is bucking with respect to the other coils 32, 32, the full scale deflection will be less than 120° to an extent, as stated above, depending upon the difference between the numbers of turns of the two sections 132, 232. On the other hand, if the predominant effect of the coil combination (132—232) is cumulative with respect to the other coils 32, 32, the full scale deflection will be greater than 120° to an extent depending upon the difference between the numbers of turns of the two sections 132, 232.

The elements 46, 48, 50 shown in Fig. 2 will be recognized as being similar to the corresponding parts similarly designated in Fig. 1 and described above. A resistor 82 is electrically connected across the line 172 (preferably through a resistance 83, hereinafter described) supplied by a suitable source of E. M. F. The float-controlled contact 46 is electrically connected to the outer end of the upper right hand coil 32 and to the inner end of the upper left hand coil 32. The outer end of the upper left hand coil 32 is electrically connected to the upper end of the resistor 82 and to the inner end of the composite coil 32 (132—232). The inner end of the upper right hand coil 32 is electrically connected to the lower end of the resistor 82 and to the outer end of the composite coil 32 (132—232).

Whatever the selected full scale deflection may be, the scale 28 is so calibrated and the design is such that the pointer 26 will indicate, upon the scale 28, the remote liquid level.

In order that short circuits across the line 172 at the transmitting station, or between the transmitting station and the indicating instrument, shall not damage the battery or so reduce its terminal E. M. F. as to render the operation of other instruments connected to the same line or source inaccurate and unreliable, I provide a protective resistance 83, mentioned above, and connected as shown. The resistance of this element 83 is such, with respect to the electrical constants of the rest of the system, as to prevent the undesirable consequences, spoken of above, that might otherwise result.

While other electrical constants may be employed, I have found that the following will give satisfactory results for a desired scale deflection less than 120°. The resistance of the resistor 82 is 200 ohms and that of the protective resistor 83 is 150 ohms. Each coil 32 has 1600 turns and a resistance of 450 ohms. One of the coil sections 132, 232 has 900 turns and the other 700 turns, with the predominant effect bucking with respect to the other two coils 32, 32. The E. M. F. at 172 is twelve volts.

In some cases and by proper selection of electrical constants more than one indicator may be reliably controlled by the same transmitter by connecting the indicating instruments in parallel. For example, in the arrangement shown in Fig. 2 and with the electrical constants as above set forth, a second instrument identical to the instrument 10—26—28—32—83 may be electrically connected in parallel therewith across the leads or conductors 90 and the positive line 72. Reliability in indication has been attained in such use of a plurality of indicating instruments by virtue of the comparatively high resistance of the coils 32, 32, 32 (132—232) with respect to the resistance of the potentiometer or resistor 82. Also, in the arrangement shown in Fig. 1, and with the electrical constants as set forth in connection with the said Fig. 1, a second instrument identical to the instrument 10—26—28—32—70 may be electrically connected in parallel therewith across the leads or conductors which are connected to the taps 74, 75, 76—78, and to the upper side of the source 72.

In the above described systems, the control element at the transmitting station has been shown as a movable element 46. The indicating instrument may be controlled by other devices such as a resistance bulb. Such a control is shown in Fig. 3, which shows also different electrical connections.

In Fig. 3, the resistors 92, 94, and 96 constitute three arms of a bridge circuit of which the fourth arm is a resistor bulb or thermally responsive element indicated diagrammatically at 98. The instrument 10—26—28—32 will be recognized as the same as that above described in connection with Fig. 1 but has its coils connected differently. One coil 32 is connected across the bridge at 102, 102, and the other two coils 32, 32 are connected in the manner illustrated, across the battery or source of E. M. F. 72. The battery is connected across the bridge circuit at 100, 100.

The resistance of the device 98 depends upon the temperature of the medium surrounding it and varies in accordance with changes in temperature. The scale 28 may therefore be so calibrated that the pointer 26 will automatically indicate the temperature at the transmitting station.

It will now be seen that my novel instrument shown in Figs. 4, 5 and 6 lends iself to use in a variety of combinations (some of which are also novel) without any change in the instrument other than in the electrical connections of the coils 32. By providing one of the coils 32 with separate windings and suitable leads, the same instrument shown in the other figures of drawings may also be employed in the combination shown in Fig. 2. Thus, the number of instruments required to be kept in stock for a wide variety of purposes and uses, is minimized.

It is to be understood that each of the four discs or sections of the rotor 10 (Fig. 4) is so mounted and permanently magnetized or poled that the lines connecting the opposite poles of each of the four sections lie in a single plane containing the geometric axis of the rotor. In other words, a transverse section of any of the four discs would appear as indicated in the central part of Fig. 5.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted, and some of the features of each modification may be embodied in the others, without interfering with the more general results outlined, and the invention extends to such use within the scope of the appended claims.

What I claim is:

1. An indicating instrument including a permanently magnetized cylindrical rotor and a plurality of coils angularly spaced around the rotor for actuating said rotor to various positions throughout substantially 360°, a source of E. M. F., an electrical circuit for said coils including a variable element, said variable element selectively determining the relative strength of current supplied to said coils from said source of E. M. F., said circuit including a plurality of resistors each connected at one end to said source of E. M. F. and at its other end to a corresponding one of the coils, one end of each of said coils having a common connection.

2. An indicating instrument including a permanently magnetized rotor and a plurality of coils angularly spaced around said rotor and each having its axis radial with respect to said rotor, a plurality of resistors each connected at one end to a corresponding one of said coils, the other ends of said coils being electrically connected together, a source of E. M. F., means electrically connecting the ends of said resistors opposite said first mentioned ends to said source of E. M. F., and means including a variable resistance connected to said coils and resistors for controlling the supply of current to said coils from said source of E. M. F.

3. A telemetering system comprising a transmitter, a receiver, a set of resistors and conductors joining the transmitter to the resistor set and the receiver, the transmitter comprising an electrically continuous resistor with three terminals connected thereto and a brush adapted to make contact with points along the resistor in accordance with the indication to be transmitted, the receiver comprising a plurality of current-conducting coils and a unidirectionally magnetized rotor rotatable in response to variations in current distribution in the receiver coils, said coils being star-connected to the terminals of the transmitter resistor, the said resistor set also being star-connected to the transmitter resistor terminals and having a neutral point adapted to be connected to one terminal of a current source, the other terminal of which is connected to the transmitter brush.

4. A telemetering system comprising a transmitter, a receiver and a set of resistors, the transmitter comprising a resistor having a plurality of terminals and a movable brush adapted to make electrical contact with various points in response to variations in the indications to be transmitted, the resistor set comprising a plurality of resistors star-connected to the terminals of the transmitter resistor and having a neutral terminal adapted to be connected to one terminal of a current source, the other terminal of which is electrically connected to the transmitter brush, the receiver comprising electrical windings and a unidirectionally magnetized rotor in inductive relation to said windings and movable in response to variations in the current distribution in the receiver winding, said windings being star-connected with terminals connected to the resistor set.

5. A telemetering system comprising a transmitter, a receiver and a set of current-distributing resistors, said transmitter comprising a resistor with a plurality of terminals and a brush adapted to make contact with different points on the resistor in response to variations in an indication to be transmitted, the said set of resistors comprising a plurality of resistors star-connected to the terminals of the transmitter and having a neutral terminal, the said neutral terminal and the transmitter brush being adapted to be connected to a current source, the receiver comprising current-conducting windings and a magnetic rotor movable in response to variations in current distribution in said windings, said windings having a plurality of terminals star-connected to said resistor set.

FREDERICK J. LINGEL.

CERTIFICATE OF CORRECTION.

Patent No. 2,391,058.                                     December 18, 1945.

FREDERICK J. LINGEL.

It is hereby certified that error appears in the printed specification of the above numbered patent requiring correction as follows: Page 3, first column, line 13, for "sensititive" read --sensitive--; line 72, for the numeral "240" read --250--; and that the said Letters Patent should be read with this correction therein that the same may conform to the record of the case in the Patent Office.

Signed and sealed this 19th day of February, A. D. 1946.

Leslie Frazer (Seal)                                First Assistant Commissioner of Patents.